United States Patent
Witt et al.

(10) Patent No.: US 6,596,822 B1
(45) Date of Patent: Jul. 22, 2003

(54) GAS PHASE POLYMERIZATION METHOD

(75) Inventors: Michael Witt, Rotorua (NZ); Andreas Deckers, Flomborn (DE); Farid Rizk, Neuhofen (DE); Kaspar Evertz, Schifferstadt (DE)

(73) Assignee: Basell Polyolefine GmbH (DE)

( * ) Notice: Subject to any disclaimer, the term of this patent is extended or adjusted under 35 U.S.C. 154(b) by 0 days.

(21) Appl. No.: 10/089,749

(22) PCT Filed: Sep. 28, 2000

(86) PCT No.: PCT/EP00/09474

§ 371 (c)(1),
(2), (4) Date: Apr. 2, 2002

(87) PCT Pub. No.: WO01/25286

PCT Pub. Date: Apr. 12, 2001

(30) Foreign Application Priority Data

Oct. 6, 1999 (DE) .......................... 199 48 280

(51) Int. Cl.$^7$ .................................................. C08F 2/34
(52) U.S. Cl. ...................... 526/68; 526/348; 526/348.5; 526/901; 422/131; 422/139
(58) Field of Search ........................ 526/68, 348, 348.5, 526/901; 422/131, 139

(56) References Cited

U.S. PATENT DOCUMENTS 4,665,143 A   5/1987  Ahluwalia et al. ............ 526/88

FOREIGN PATENT DOCUMENTS

| EP | 0341540 | | 11/1989 |
| EP | 0415427 | | 3/1991 |
| EP | 0728772 | | 8/1996 |
| EP | 0728772 | A1 * | 8/1996 |
| EP | 0801081 | | 10/1997 |

\* cited by examiner

Primary Examiner—Donald R. Wilson
Assistant Examiner—William K Cheung
(74) Attorney, Agent, or Firm—Connolly Bove Lodge & Hutz LLP

(57) ABSTRACT

The invention relates to a method and an apparatus for the polymerization of gaseous olefins, in particular of ethylene and at least one α-olefin, in the gas phase in a stirred or fluidized, catalyst-containing polymerization zone (2) and at least one decompression zone (6, 10) downstream of the polymerization zone (2). The mixture of solid (co)polymer and unreacted monomers leaving the polymerization zone (2) flows through a settling zone, in particular in the form of a settling leg (14), before the decompression zone.

10 Claims, 1 Drawing Sheet

GAS PHASE POLYMERIZATION METHOD

Figure 1:
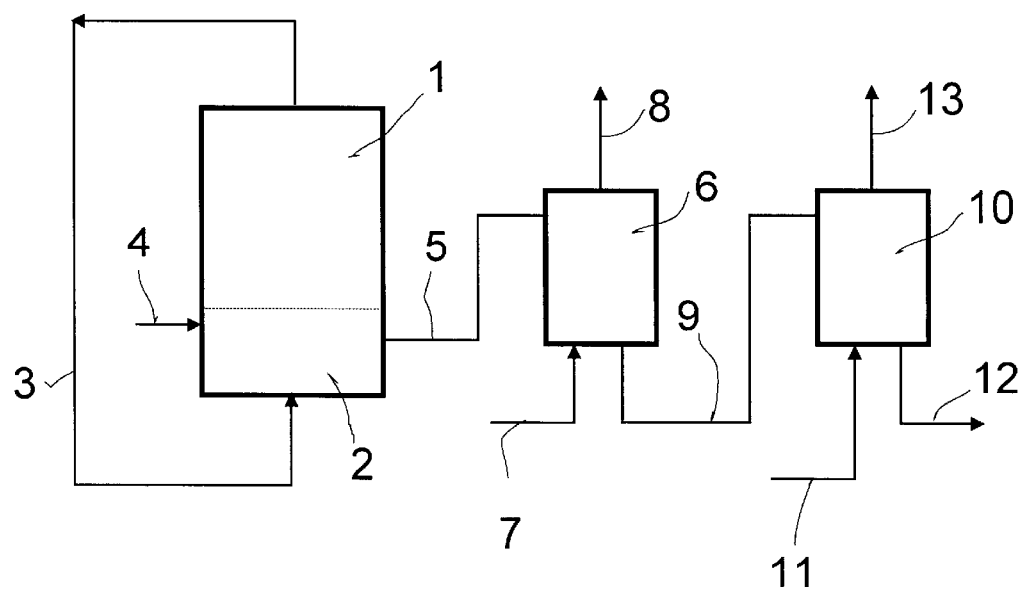

The invention relates to a method for the polymerization of gaseous, unsaturated monomers, in particular of ethylene and at least one α-olefin, in the gas phase, and to an apparatus for carrying out a method of this type.

Gas phase polymerization methods have been carried out on an industrial scale for many years, but still have some disadvantages. A working area of this type is the transition between the actual polymerization zone and the decompression zone, generally downstream, for the mixture of solid (co)polymer, unreacted monomer or unreacted monomers and inert substances leaving the polymerization zone.

EP-B 0 341 540 describes a method for the continuous production of copolymers of ethylene and α-olefins in which the monomers are reacted by catalytic dry phase copolymerization in a stirred or fluidized polymerization zone (for example a fluidized bed reactor). The resultant mixture of solid copolymer and unreacted gaseous monomers is transferred into a decompression zone. After this pressure reduction, the mixture is separated into a solid phase and a gaseous phase. Besides recycling of the unreacted gaseous monomers into the polymerization, a procedure is followed in which the solid phase is pre-flushed with gaseous ethylene and subsequently post-flushed with an $N_2/H_2O$ vapor mixture (each in a shaft apparatus). The gaseous phases can be recycled into the process, and the copolymer is substantially free from residual monomers, odor substances and flavour substances. In practice, however, this work-up can result in the formation of fisheyes, which greatly impair the serviceability of the (co)polymer.

A variant of the above method is revealed by EP-A 0 801 081, in which the solid (co)polymer (for example of ethylene and 1-hexene) from a gas phase polymerization which still contains unreacted monomers or solvents (for example from the added catalyst) is after-treated in two steps. In a first step, it is flushed or dried with at least one of the monomers (for example ethylene) employed in the (co)polymerization, if desired also in the presence of hydrogen. A second step comprises flushing with a drying gas (for example $N_2$) containing an inert gas. The flushing/drying is carried out in two reactors, but can also be carried out in a single reactor. In a one-reactor system, this contains, for example, a pitched roof or umbrella shape internal element, which divides the reactor into a first treatment zone with the first drying/flushing gas and a second treatment zone with the second drying/flushing gas, and which also serves to collect this second drying/flushing gas after its use in the second zone and to facilitate its removal from the reactor. The cylindrical reactor is domed at the upper end and tapers conically at the lower end, so that the outlet for the dry polymer is at the lowest point of the reactor. Here too, the presence of catalyst and supplied polymerizable monomer causes post-polymerization, which—as already mentioned—can result in fisheye formation.

Another method is described in EP-A 0 728 772. Here, the mixture from the gas phase polymerization is brought to post-polymerization for from 5 to 120 seconds before the subsequent degassing and/or flushing of the solid polymer in an intermediate vessel (lock hopper) with inlet and outlet valves, this post-polymerization taking place essentially under identical pressure and temperature conditions as in the principal polymerization reactor. It is disadvantageous in this method that firstly the intermediate vessel can easily become blocked and secondly a large amount of compressed reactor gas is discharged per product weight unit.

The object of the present invention was to find an apparatus on whose use in gas phase polymerization or work-up of the crude product the disadvantages described do not occur, i.e. to find a method which, although using post-polymerization of the polymerizable monomers still present, with its positive effects, significantly reduces, however, the risk of blockages and fisheye formation.

The method according to the invention which has been found in order to achieve this object is based on the known method for the polymerization of gaseous olefins, in particular of ethylene and at least one α-olefin, in the gas phase in a stirred or fluidized, catalyst-containing polymerization zone and at least one decompression zone downstream of the polymerization zone. The method according to the invention is then characterized in that the mixture of solid (co)polymer and unreacted monomers leaving the polymerization zone flows through a settling zone before the decompression zone.

The settling zone is preferably implemented by means of so-called settling legs, whose aperture projects into the polymerization zone; gas and heat exchange with the reactor are substantially interrupted in the settling leg. The polymerization preferably relates to the production of copolymers, but can also be used for the production of homopolymers, for example from ethylene or propylene.

In preferred embodiments, the mixture flows through a settling leg, the only co-component present is an α-olefin, in particular 1-hexene, and the mixture warms in the settling leg by at least 1 K, preferably by at least 2 K, measured between its temperature on entry into the settling leg and on its exit therefrom.

A further solution is an apparatus for carrying out a gas phase polymerization, containing a) a device having a stirred or fluidized, catalyst-containing polymerization zone for the polymerization of gaseous olefins, in particular of ethylene and at least one α-olefin, b) devices for the introduction of catalyst and for the circulation of the gaseous polymerization mixture, and c) at least one device in the form of a settling leg, which is arranged between the device a) and downstream devices of a decompression zone, and through which the mixture of solid (co)polymer and unreacted monomers leaving the polymerization zone flows.

In preferred embodiments, a reactor is present in a) and a treatment tank in c) for decompression, and the apparatus has a plurality of settling legs, with apparatuses having only one settling leg on the reactor also being possible.

The invention is explained in greater detail in the following description of the figures and the working examples.

The essential advantages of the invention are:

A significant increase in the amount of solid which can be discharged per volume unit and thus a reduction in the proportion of reactor gas discharged concomitantly.

An additional residence time of the reactor mixture without simultaneous gas exchange with the reactor over a time period which can be predetermined (in the region of seconds, but also up to, for example, 2 minutes), with the possibility of reducing the degassing expenditure in the decompression zone through homogeneous post-polymerization with slightly increasing temperature.

A reduction in the risk of blockages during large-scale industrial production.

Figure 2:
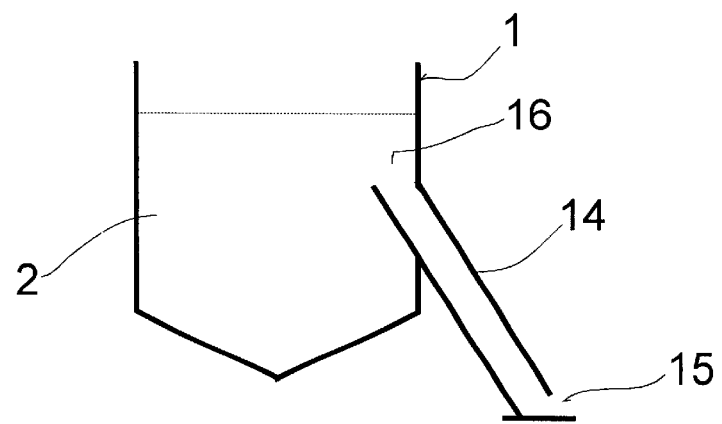

In the attached drawing,

FIG. 1 shows a diagrammatic representation of the design of a conventional plant for gas phase polymerization, and FIG. 2 shows the part of a reaction tank which has a settling leg installed according to the invention.

In FIG. 1, the gaseous reaction mixture from the reactor 1, in which it flows upwards through a stirred or fluidized polymerization zone 2, which contains the catalyst and the solid monomer or copolymer forming, is recycled into the reactor 1 in circuit 3. The catalyst is introduced into the reactor 1 in portions or continuously via the inlet 4. The crude polymerization product—essentially comprising solid (co)polymer, catalyst fractions and unreacted monomers—is removed in portions or continuously via an outlet line 5, decompressed in a first treatment tank 6 and flushed with, for example, $N_2$, which is introduced via line 7. Residual monomers removed from the solid polymer in this way can be recycled into the reactor 1 via the outlet 8. The pre-flushed polymer from the first treatment tank 6 is introduced via line 9 into a second treatment tank 10, in which it can additionally be deodorized, for example with the aid of $N_2/H_2O$ vapor mixture introduced via line 11, and then removed from the system via the outlet 12. Residual monomers still present are fed to, for example, catalytic offgas combustion via the outlet 13.

FIG. 2 shows the part of a reaction tank, for example of a reactor 1, which contains the installation according to the invention of a so-called settling leg 14. This is taken to mean by polymerization engineers a generally tubular plant part of different cross section which is arranged, for example, between the actual reaction part of a reaction tank and the outlet for the reaction product, and in which a solid reaction product that has formed is able to settle. A settling leg of this type typically contains an outlet 15, which may be, for example, a valve. The inlet aperture 16 of the settling leg is preferably arranged in the reactor 1 in such a way that it is located in the lower part of the polymerization zone 2, with the outer—viewed from the direction of the center point of the reactor—tube wall half being integrated into the reactor inner wall in the vicinity of the aperture. The inner tube wall half is therefore located within the reactor. The largest part of the settling leg 14, i.e. at least 60% of its total length, is located outside the reactor 1. The polymer which can be removed from the settling leg can subsequently be fed to a conventional decompression tank, for example a first treatment tank 6 or a second treatment tank 10, as shown in FIG. 1.

EXAMPLE 1 (ACCORDING TO THE INVENTION)

Ethylene and 1-hexene were copolymerized in a gas phase reactor having a reaction zone with a height of 4 m and an internal diameter of 50 cm on a conventional chromium-containing, $SiO_2$-supported catalyst, which was treated at a temperature of 700° C. for a period of 2 hours. The crude product (150 kg) had a density of 0.942 g/cm$^3$, the mean particle size was 800 μm, measured by the Rosin, Rammler, Sperling, Bennett method, DIN 66145, and the density of the fluidized bed was 290 kg/m$^3$.

The settling leg employed was a tube having a length of 70 cm and an internal diameter of 5 cm which was provided with a valve at the lower end and which projected into the reactor to the extent of about 10%. The part located outside the reactor had a thermally insulated design.

The set residence time of the reaction mixture was 1 minute in the settling leg. In this time, the temperature of the product to be discharged rose by 3 K therein.

EXAMPLE 2 (COMPARATIVE EXAMPLE)

Under the same conditions as in Example 1, a copolymer was produced in the gas phase reactor, but the product was immediately transferred into the decompression tank without an additional residence time in the settling leg. The results are shown in the following table:

TABLE

| Residual $C_6$-hydrocarbon content in the decompression tank [ppm] | Example 1 | Example 2 |
|---|---|---|
| at the inlet | 1300 | 1500 |
| at the outlet | 100 | 300 |
| density of the copolymer [g/cm$^3$] | 0.942 | 0.942 |
| $HLMI_{21.4/190}$ [dg/min] (ISO 1133) | 22 | 22 |

What is claimed is:

1. Method for the polymerization of gaseous olefins in the gas phase in a stirred or fluidized, catalyst-containing polymerization zone and at least one decompression zone downstream of the polymerization zone, characterized in that the mixture of solid (co)polymer and unreacted monomers leaving the polymerization zone flows through a settling zone before the decompression zone, during which it warms up by at least 1 K, measured between the temperature on entry into the settling zone and its exit therefrom.

2. Method according to claim 1, characterized in that the mixture flows through a settling leg.

3. Method according to claim 1, characterized in that a copolymer of ethylene and an α-olefin is produced.

4. Method according to claim 1, characterized in that a copolymer of ethylene and 1-hexene is produced.

5. Method according to claim 1, characterized in that the mixture warms in the settling zone by at least 1 K, measured between its temperature on entry into the settling zone and on its exit therefrom.

6. Apparatus according to claim 5, characterized in that the device (1) is a reactor, in that the decompression zone has a treatment tank (6), and in that a plurality of settling legs (14) are present.

7. Apparatus according to claim 5 or 6, characterized in that the settling leg (14) is designed as a tubular plant part of different cross section which contains an outlet (15), which is preferably a valve.

8. Apparatus according to claim 6, characterized in that the settling leg (14) is designed as a tubular plant part of different cross section which contains an outlet (15), which is preferably a valve.

9. Apparatus according to claim 6, characterized in that the settling leg (14) contains an inlet aperture (16) which is arranged in the reactor (1) in such a way that it is located in the lower part of the polymerization zone (2), with the outer tube wall half being integrated into the reactor inner wall in the vicinity of the aperture, and with the inner tube wall half being located within the reactor (1).

10. Apparatus according to claim 6, characterized in that at least 60% of the total length of the settling leg (14) is located outside the reactor (1) and is thermally insulated.

* * * * *

UNITED STATES PATENT AND TRADEMARK OFFICE
CERTIFICATE OF CORRECTION

PATENT NO.    : 6,596,822 B2
DATED         : July 22, 2003
INVENTOR(S)   : Michael Witt et al.

It is certified that error appears in the above-identified patent and that said Letters Patent is hereby corrected as shown below:

Column 4,
Lines 23, 29, 31, 33, 35, 39, 44, 48, 52 and 59, delete "characterized in that" and insert -- wherein --.

Signed and Sealed this

Fourteenth Day of October, 2003

JAMES E. ROGAN
*Director of the United States Patent and Trademark Office*